(12) United States Patent
Lang et al.

(10) Patent No.: US 6,371,620 B1
(45) Date of Patent: Apr. 16, 2002

(54) OUTSIDE MIRROR WITH QUICK ASSEMBLY

(75) Inventors: Heinrich Lang; Dirk Krzysanowski, both of Deutschland (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/505,248

(22) Filed: Feb. 15, 2000

(30) Foreign Application Priority Data

Nov. 23, 1999 (EP) .......................................... 99123362

(51) Int. Cl.$^7$ ............................................. G02B 7/182
(52) U.S. Cl. ....................... 359/872; 248/479; 248/486
(58) Field of Search ............................. 359/872, 876, 359/841, 881; 248/475.1, 479, 486, 480, 483, 484, 900

(56) References Cited

U.S. PATENT DOCUMENTS

| | | |
|---|---|---|
| 3,107,077 A | 10/1963 | Lassa |
| 3,119,591 A | 1/1964 | Malecki |
| 3,339,876 A | 9/1967 | Kampa |
| 3,346,229 A | 10/1967 | Carson, Jr. |
| 3,371,903 A | 3/1968 | Thompson |
| 3,384,334 A | 5/1968 | Malachowski |
| 3,476,464 A | 11/1969 | Clark |
| 4,623,115 A | 11/1986 | Brester |
| 4,789,232 A | 12/1988 | Urbanek |
| 4,824,065 A | 4/1989 | Manzoni |
| 4,854,539 A | * 8/1989 | Glue ........................ 248/479 |
| 5,022,748 A | 6/1991 | Santo |
| 5,044,596 A | 9/1991 | Santo |
| 5,081,546 A | 1/1992 | Bottrill |
| 5,120,015 A | 6/1992 | Santo |
| 5,137,247 A | 8/1992 | Lang et al. |
| 5,432,640 A | 7/1995 | Gilbert et al. |
| 5,625,502 A | 4/1997 | Hoogenboom et al. |

FOREIGN PATENT DOCUMENTS

| | | |
|---|---|---|
| EP | 0139509 A2 | 5/1985 |
| EP | 0449080 A1 | 10/1991 |
| EP | 0527455 A1 | 2/1993 |

OTHER PUBLICATIONS

European Search Report App. Ser. No. 99123362 (3 pages), May 4, 2000, Abstract (1 page).
English translation of European Search Report App. Ser. No. 99123362, May 4, 2000, Abstract (1 page).

* cited by examiner

Primary Examiner—Mark A. Robinson
(74) Attorney, Agent, or Firm—Dority & Manning, P.A.

(57) ABSTRACT

An external mirror assembly for a vehicle is disclosed including a mirror head assembly including a housing, mirror secured to the housing, and two support arms extending from the housing. A mirror holder is disposed between the two support arms for mounting the mirror head assembly to the vehicle. A first connecting member secures together the mirror holder assembly and the mirror holder; and a second connecting member assembly secures together the mirror head assembly and the mirror holder. The second connecting member includes an extension extending radially therefrom, and one of the support arms defines an axially extending opening and a slot extending axially along the opening. The second connecting member is configured so that the extension is slidable within the slot when the second connecting member is axially slid relative to the one support arm, and so that the second connecting member is rotatable relative to the one support arm when the extension is slid completely through the slot to thereby secure together the mirror head assembly and the mirror holder.

17 Claims, 5 Drawing Sheets

OUTSIDE MIRROR WITH QUICK ASSEMBLY

BACKGROUND OF THE INVENTION

The invention concerns an outside mirror for motor vehicles mounted via a pivot bearing assembly.

An adjustable rearview mirror arrangement for motor vehicles has been disclosed by EP 0 609 508 B1. The pivoting mechanism of this rearview mirror arrangement includes a holding plate upon which the mirror carrier plate of the mirror pane is fastened by a force fit. In this way, a simple mounting and demounting is made possible.

An outside mirror for commercial vehicles has come into common knowledge through German Patent DE 93 08 052.2. This known outside mirror is comprised of a housing, a carrier plate, a pivoting mechanism, at least one mirror pane which is mounted upon a mirror carrier plate and two support arms, which connect the mirror carrier with the vehicle. The two support arms are made of one-piece and molded onto the carrier plate. The connection between the support arms and the mirror carrier is a pivot bearing arrangement. The mirror carrier plate exhibits a pivoting axle boring, which is aligned with the upper and lower axle receptors on the vehicle end of the two support arms. By means of a long bolt, which penetrates the lower axle receptor and the pivot axle boring and is screwed into the upper axle receptor, the mirror is held together and fixed at a specified angular setting. The mounting of the corresponding mirror on the mirror holder is not entirely simple, since the two parts must be held in such juxtaposition, that the axle receptors and the pivot bearing are held in alignment until the bolt has been screwed in.

SUMMARY OF THE INVENTION

Thus, the purpose of the present invention is to make available an outside mirror for motor vehicles which provides particular ease of mounting. The achievement of this purpose is effected by the features of the present invention.

A simple preassembly of the mirror on the vehicle is made possible by the provision of a spacer piece in the pivot bearing, with a first position in which it is movable in the direction of the pivoting axis into a second position in which it is not so movable. Before mounting, the spacer piece is pushed downward, so that the mirror holder can be positioned between the upper and the lower support arms. When so positioned, the spacer piece is pressed upward, so that it engages in the mirror holder. The spacer piece is fixed in this position by twisting, whereby the mirror is preassembled. The insertion of the long bolt which penetrates the pivot bearing now becomes possible without any further fingertip trial and error. Other advantageous features are also provided by the invention.

BRIEF DESCRIPTION OF THE DRAWINGS

Further details, features and advantages of the invention become evident from a consideration of an embodiment of the invention, in connection with the attached drawings. There is shown in.

DETAILED DESCRIPTION OF THE PREFERRED EMBODIMENT

Detailed reference will now be made to the drawings in which examples embodying the invention are shown. The examples set forth are provided by way of explanation of the invention and are not meant as a limitation of the invention. The present invention thus includes any modifications or variations of the following examples as come within the scope of the appended claims and their equivalents.

Figure 1A:
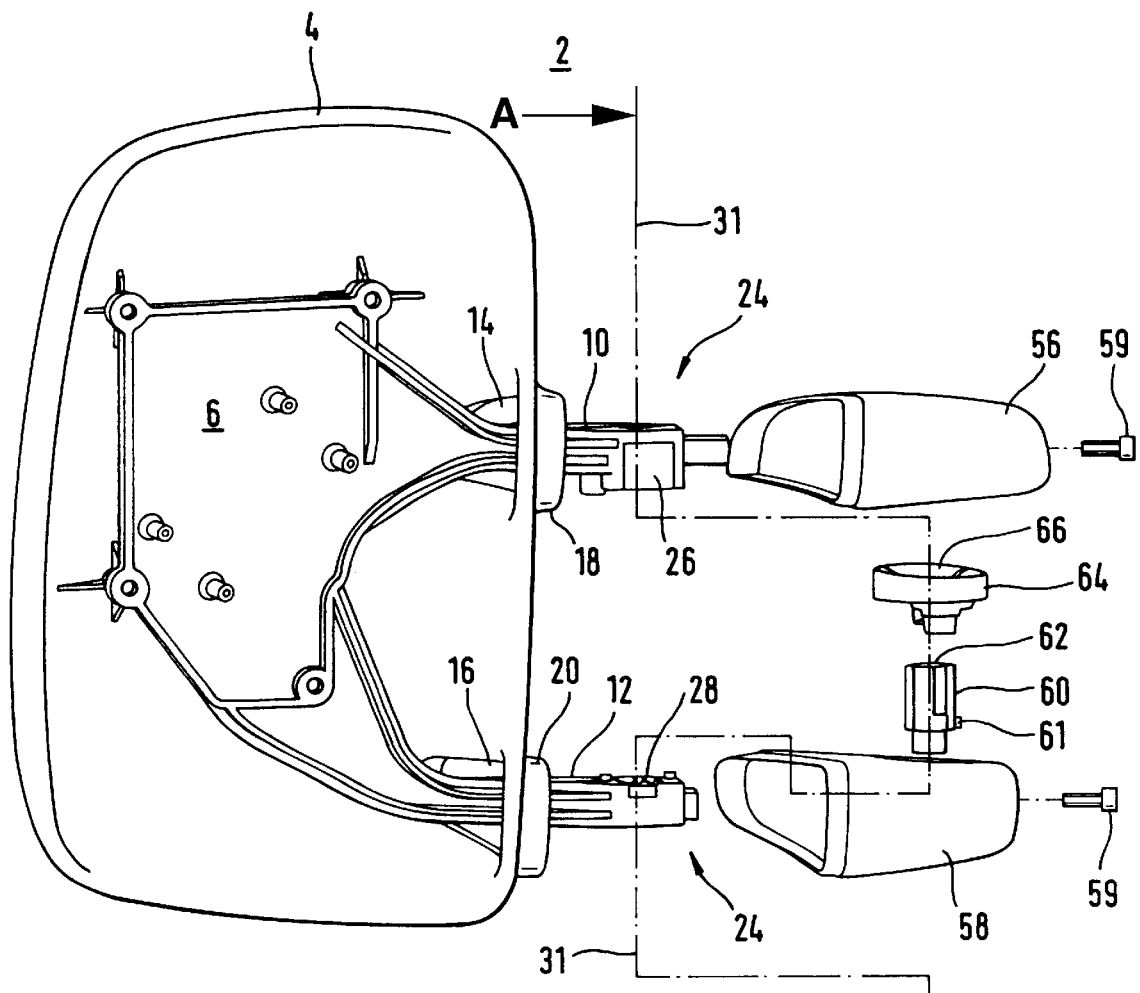
FIG. 1a: an exploded view of one embodiment of the invention showing a mirror head assembly.
Figure 1B:
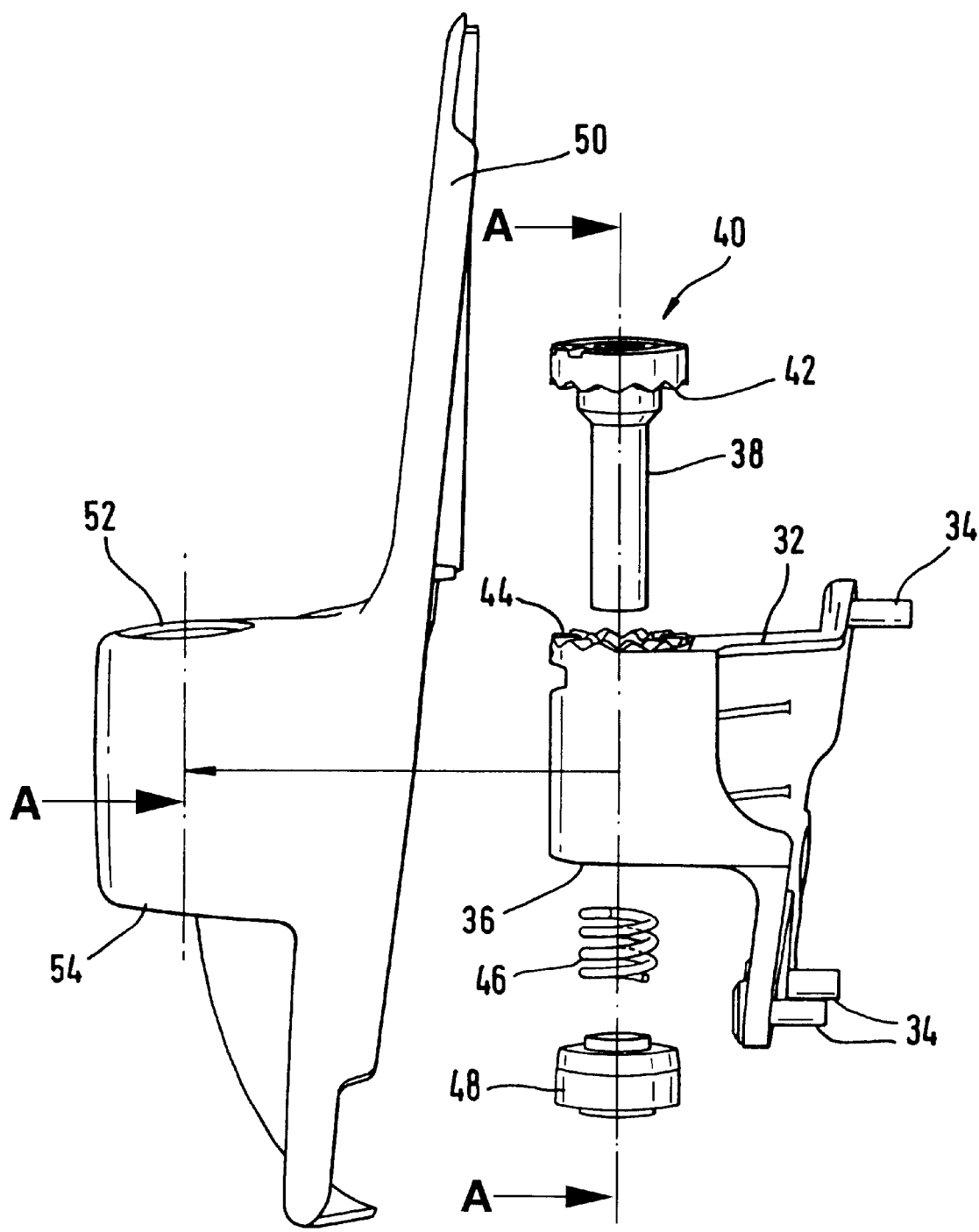
FIG. 1b: an exploded view of one embodiment of the invention showing a mirror holder assembly.
Figure 2:
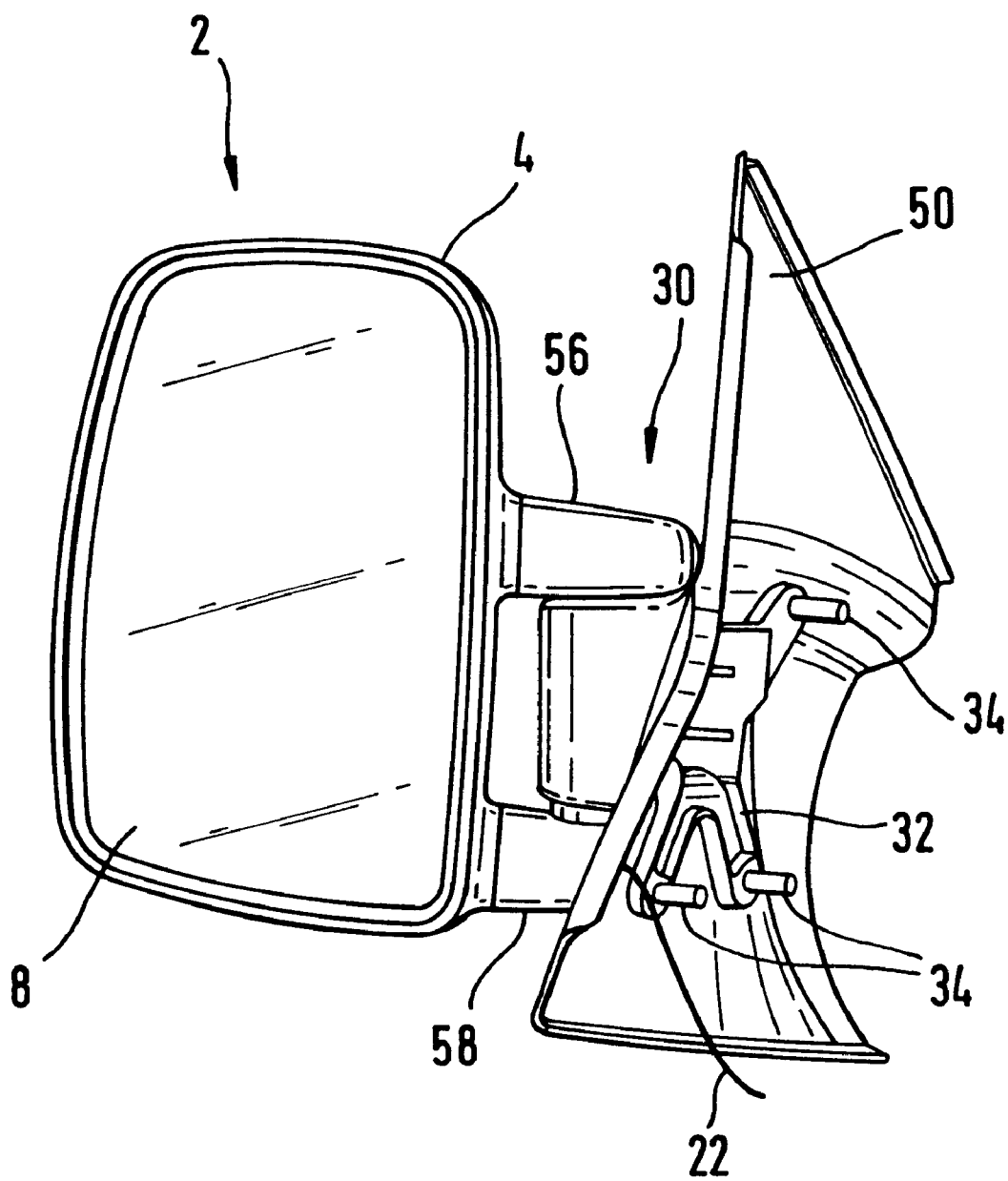
FIG. 2: a rear view of the embodiment of FIGS. 1a and 1b in its assembled state.

The outside rearview mirror assembly in accord with FIGS. 1a, 1b, and 2 encompasses a mirror head 2 assembly. This mirror head assembly in turn includes a housing 4, a carrier plate 6 within the housing 4 and a mirror assembly 8, which is pivotally mounted on the carrier plate. In regard to details of the mirror assembly, see EP 0 609 508 B 1.

The housing 4 is fastened to the carrier plate 6. An upper and a lower support arm 10, 12, respectively, extend at a spatial interval from one another. The two support arms 10,12 extend essentially parallel to one another and are molded unitarily with the carrier plate 6. The two support arms 10, 12 extend through an upper and a lower opening, respectively, 14, 16, which are provided laterally in the housing 4. At either one of the openings 14, 16, is an integral, molded collar 18, 20 respectively. Through the lower opening 16 a cable 22 is run, which provides the electrical connection for the electrical components (not described here in greater detail) of the mirror assembly 8.

The two extending support arms 10, 12, possess on their vehicle ends 24 upper and lower axle receptacles 26, 28, respectively. The axle receptacle 26 in the upper support arm 10 is comprised of a threaded axle and the lower axle receptacle 28 is a boring. Further, a bifurcated pivot bearing 30 is formed by these two axle receptacles 26, 28 in arms 10, 12 on their vehicle ends 24 allowing swinging about an axis of rotation 31, with the arms being connected to the mirror holder 32. This mirror holder 32 is affixed, by the use of screw openings 34, onto a vehicle which is not further described. The mirror holder 32 is penetrated by a pivot axle sleeve 36, which is aligned with the upper and the lower axle receptacles 26, 28 along axis 31.

Figure 3:
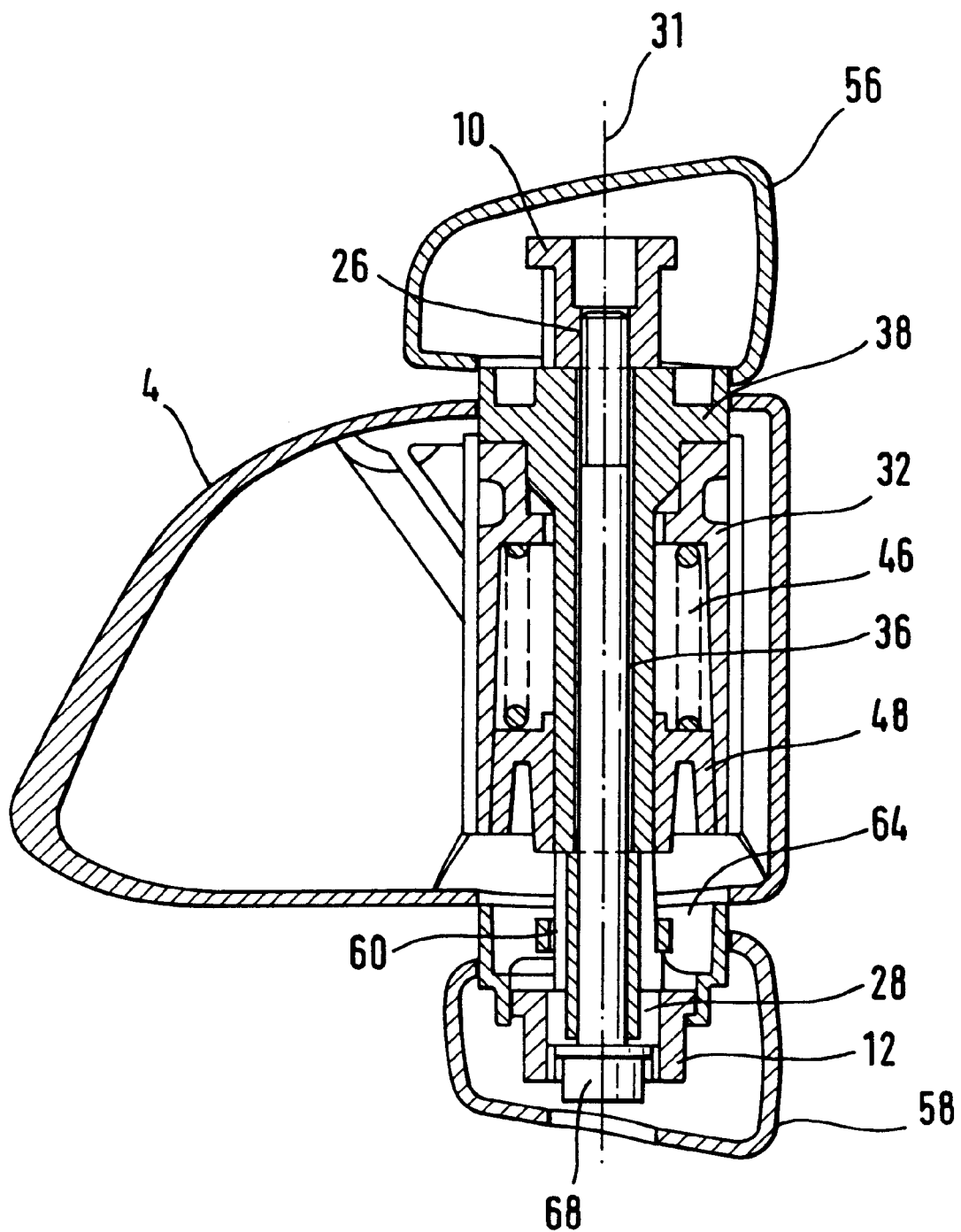
FIG 3: a sectional view taken along the line A—A in FIGS 1a and 1b.

The pivot bearing 30 includes an upper axle sheath 38 which can be slipped into place from above, over the pivot axle sleeve 36 locking into the mirror holder 32. The upper axle sheath 38 has an upper end 40 which flares outwardly. This upper end 40 of the upper axle sheath 38 possesses on its circumferential under-side proximal to the mirror holder 32 a first, ringlike, notched surface 42. This first notched surface 42 engages a corresponding second notched surface 44, which is placed, again ringlike, on the upper side of the mirror holder 32. Below this notched assembly is inserted in the mirror holder 32 a spiral spring 46 and a lower axle sheath 48. The mirror holder 32 is covered, when in the finished mounted condition on the vehicle (see FIG. 3), by a mirror holder cover 50, which has an upper and a lower opening, respectively 52, 54. These openings align with the pivoting axis 31.

Previous to the final mounting, still another upper shroud 56 is slipped over the upper support arm 10, extending also over the upper collar 18 of the upper opening 14 through the housing 4. In similar manner, a lower shroud 58 is slipped over the lower support arm 12 and extends also over the lower collar 20. The upper and lower collars 18, 20, and the two respective shrouds 56, 58 are so designed, that the two shrouds 56 and 58 are sealed against the housing 4 in a watertight manner. After the mirror holder 32 is affixed to the vehicle (not further described), it is protected by the mirror holder covering 50.

Figure 4:
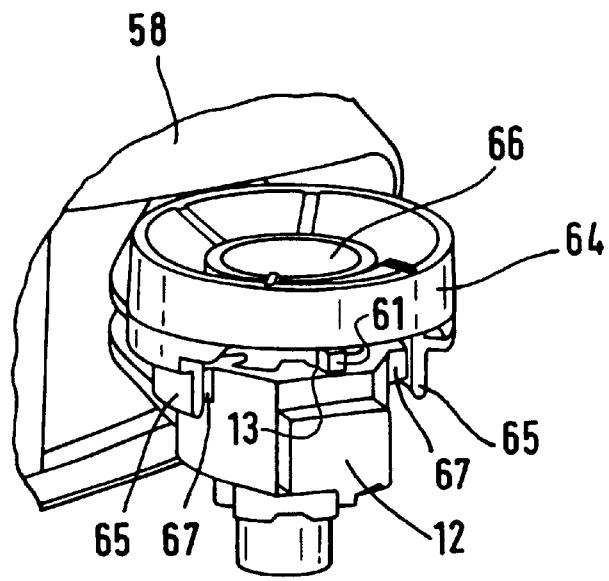
FIG. 4: a partial perspective view of elements from a portion of FIG. 1a showing the placement of the transition ring on the lower axle seat.

As may be seen in FIG. 1a, in the lower axle receptacle boring 28, a spacer ring 60 having an extension 61 is located. Spacer ring 60 has a central boring 62, which is aligned with the pivoting axis 31. FIG. 4 demonstrates how a transition ring 64 is placed on the lower axle receptacle 28 of arm 12 having a slot 13, the ring having a central opening 66. The transition ring 64 possesses circumferential cover plates 65 which force-fit engage in protruding members 67 projecting from the lower support arm 12.

In the assembled, mounted condition, the mirror head assembly 2 and the mirror holder assembly 32 are held together by a long, partially threaded bolt 68. As FIG. 3 makes clear, the bolt 68 penetrates sequentially, the boring 28, the lower support arm 12, the spacer ring 60, the transition ring 64, the mirror holder 32 which incorporates the pivot sleeve 36 with the lower axle sheath 48, the spiral spring 46, and the upper axle sheath 38, being finally threadedly engaged in the tapped boring axis receptacle 26 in the upper support arm 10.

Figure 5A:
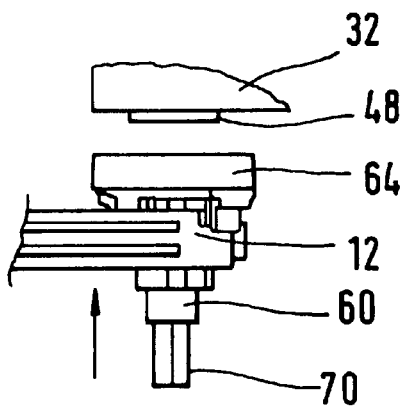
FIGS. 5a and 5b: two side views sequentially showing details of the mounting of the mirror head assembly on the mirror holder assembly.
Figure 5B:
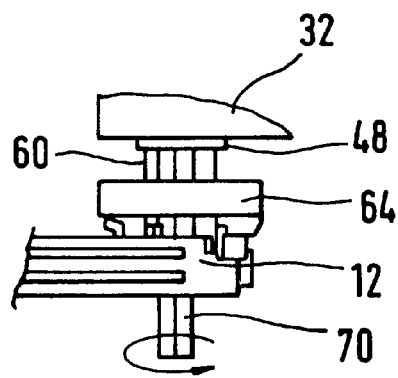

During mounting, the mirror head assembly 2 with the two support arms 10, 12 is placed on the mirror holder assembly 32, that is to say, on the pivot bearing 30, so that the threaded axle receptacle 26 in the upper support arm 10 and the boring for receptacle 28 in the lower support arm 12 align with the two axle sheaths 38 and 48 which are located in the mirror holder assembly 32. Extension 61 of spacer ring 60 is disposed in slot 13 of arm 12 (see FIG. 4). The upper end 40 of the upper axle sheath 48 engages form-fit into the upper axle receptacle 26. By means of a hexagonal key 70—see FIGS. 5a, 5b—the spacer ring 60 is pressed upwardly through the opening 66 in the lower axle sheath 48 with extension 61 sliding along slot 13. Spacer ring 60 is then rotated, so that the spacer ring 60 is no longer slidable in an axial direction by virtue of extension 61 being captured between transition ring 64 and arm 12 (see FIG. 3). By this means, the mirror head assembly 2 is affixed on the mirror holder assembly 32.

By means of this preassembly, the long bolt 68 can be inserted without problems from below through the lower axle receptacle boring 28 and be screwed into the threaded upper axle receptacle 26.

The mirror assembly 8 can be, for instance, equipped with an electrically motorized drive. Alternatively, a manually operated adjustment mechanism can be employed, as is made known in German Patent 93 08 52.2.

It will be apparent to those skilled in the art that various modifications and variations can be made in the present invention without departing from the scope and spirit of the invention. The present invention is intended to include such modifications and variations as are within the scope of the appended claims and their equivalents.

| List of Parts/Number-designations | |
|---|---|
| 02 | Mirror head |
| 04 | Housing |
| 06 | Carrier plate |
| 08 | Mirror placement |

-continued

| List of Parts/Number-designations | |
|---|---|
| 10 | Upper support arm |
| 12 | Lower support arm |
| 14 | Upper opening |
| 16 | Lower opening |
| 18 | Upper collar on 14 |
| 10 | Lower collar on 16 |
| 22 | Cable |
| 24 | Cab-side end of support arm |
| 26 | Upper threaded axle receptacle |
| 28 | Lower axle receptacle, thru-bore |
| 30 | Pivot bearing |
| 31 | Pivot axis |
| 32 | Mirror holder |
| 34 | Screw openings in 32 |
| 36 | Pivot axle sleeve in 32 |
| 38 | Upper axle sheath |
| 40 | Flared end of 52 |
| 42 | First notched element |
| 44 | Second notched element |
| 46 | Spiral spring |
| 48 | Lower axle sheath |
| 50 | Mirror holder cover |
| 52 | Upper opening in 50 |
| 54 | Lower opening in 50 |
| 56 | Upper shroud for 10 |
| 58 | Lower shroud for 12 |
| 59 | Screws |
| 60 | Spacer ring |
| 62 | Boring in 60 |
| 64 | Transition ring |
| 65 | Cover plates on 64 |
| 66 | Opening in 64 |
| 67 | Projection on 12 |
| 68 | Long Bolt, end threaded |
| 70 | Hexagonal key |

What is claimed is:

1. An external mirror assembly for a vehicle, the assembly comprising:

a mirror head assembly including a housing, a mirror secured to the housing, and two support arms extending from the housing;

a mirror holder disposed between the two support arms for mounting the mirror head assembly to the vehicle;

a first connecting member for securing together the mirror head assembly and the mirror holder; and a second connecting member assembly for securing together the mirror head assembly and the mirror holder, the second connecting member including an extension extending radially therefrom, and one of the support arms defining an axially extending opening and a slot extending axially along the opening, the second connecting member configured so that the extension is slidable within the slot when the second connecting member is axially slid relative to the one support arm, and so that the second connecting member is rotatable relative to the one support arm when the extension is slid completely through the slot to thereby secure together the mirror head assembly and the mirror holder.

2. The assembly of claim 1, wherein the first connecting member is a threaded bolt screwed into the other of the support arms.

3. The assembly of claim 1, wherein the second connecting member is a spacer ring concentrically disposed around the first connecting member.

4. The assembly of claim 1, further including a transition ring concentrically disposed around the first connecting member and secured to the one support arm.

5. The assembly of claim 4, wherein the transition ring and the one support arm define an opening therebetween for capturing the extension upon rotation of the second connecting member relative to the one support arm.

6. The assembly of claim 4, wherein the second connecting member extends through an opening in the transition ring.

7. The assembly of claim 1, further including a spring-loaded pivot bearing assembly for releasably radially holding the mirror head assembly relative to the mirror holder.

8. The assembly of claim 7, wherein the spring-loaded pivot bearing assembly includes an upper axle sheath disposed about the first connecting member and secured to the mirror head assembly, the upper axle sheath including a first notched surface, and wherein the mirror holder includes a second notched surface mateable with the first notched surface in a plurality of orientations.

9. The assembly of claim 8, wherein the spring-loaded pivot bearing assembly further includes a lower axle sheath secured to the upper axle sheath, and a spring disposed between the lower axle sheath and the housing for urging the first and second notched surfaces together.

10. An external mirror assembly for a vehicle, the assembly comprising:
    a mirror head assembly including a housing, a mirror secured to the housing, and two support arms extending from the housing;
    a mirror holder disposed between the two support arms for mounting the mirror head assembly to the vehicle;
    a bolt extending through the mirror head assembly and the mirror holder for securing together the mirror holder assembly and the mirror holder; and
    a spacer ring concentrically disposed around the bolt and configured so that the spacer ring is axially slidable into one of the support arms, and so that the spacer ring is rotatable relative to the one support arm when the spacer ring is slid completely into the support arm to thereby secure together the mirror head assembly and the mirror holder.

11. The assembly of claim 10, wherein the bolt is threaded into the other support arm.

12. The assembly of claim 10, further including a transition ring concentrically disposed around the bolt and secured to the one support arm.

13. The assembly of claim 12, wherein the transition ring and the one support arm define an opening therebetween for capturing a portion of the spacer ring upon rotation of the spacer ring relative to the one support arm.

14. The assembly of claim 12, wherein the spacer ring extends through an opening in the transition ring.

15. The assembly of claim 10, further including a spring-loaded pivot bearing assembly for releasably radially holding the mirror head assembly relative to the mirror holder.

16. The assembly of claim 15, wherein the spring-loaded pivot bearing assembly includes an upper axle sheath disposed about the bolt and secured to the mirror head assembly, the upper axle sheath including a first notched surface, and wherein the mirror holder includes a second notched surface mateable with the first notched surface in a plurality of orientations.

17. The assembly of claim 16, wherein the spring-loaded pivot bearing assembly further includes a lower axle sheath secured to the upper axle sheath, and a spring disposed between the lower axle sheath and the housing for urging the first and second notched surfaces together.

* * * * *